United States Patent
Evulet (10) Patent No.: US 8,171,732 B2
(45) Date of Patent: May 8, 2012

(54) TURBOCHARGER FOR A VEHICLE WITH A COANDA DEVICE

(75) Inventor: Andrei Tristan Evulet, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1125 days.

(21) Appl. No.: 11/530,268

(22) Filed: Sep. 8, 2006

(65) Prior Publication Data
US 2008/0060355 A1 Mar. 13, 2008

(51) Int. Cl.
*F02G 3/00* (2006.01)

(52) U.S. Cl. .......................... 60/614; 60/597

(58) Field of Classification Search ............. 60/600–624
See application file for complete search history.

(56) References Cited

U.S. PATENT DOCUMENTS

| | | | |
|---|---|---|---|
| 3,631,675 A | | 1/1972 | Keiter et al. |
| 3,643,675 A | * | 2/1972 | Wetterstad ........................ 415/1 |
| 3,744,242 A | | 7/1973 | Stettler et al. |
| 3,826,083 A | | 7/1974 | Brandon et al. |
| 3,876,362 A | | 4/1975 | Hirose |
| 3,954,382 A | | 5/1976 | Hirose |
| 4,259,840 A | * | 4/1981 | Tenney ............................ 60/602 |
| 5,085,039 A | | 2/1992 | Shekleton |
| 5,097,660 A | * | 3/1992 | Shekleton ....................... 60/806 |
| 5,402,938 A | * | 4/1995 | Sweeney ....................... 239/431 |
| 5,533,487 A | * | 7/1996 | Cailey .......................... 60/605.2 |
| 5,974,802 A | * | 11/1999 | Blake ............................ 60/605.2 |
| 6,240,911 B1 | * | 6/2001 | Patrick .......................... 123/585 |
| 6,444,345 B2 | * | 9/2002 | Sang ............................... 429/34 |
| 6,659,212 B2 | * | 12/2003 | Geisse et al. ..................... 60/608 |
| 6,715,983 B2 | * | 4/2004 | Koshoffer et al. ................ 415/1 |
| 6,748,741 B2 | * | 6/2004 | Martin et al. ................. 60/605.2 |
| 6,826,910 B1 | * | 12/2004 | Easton ............................. 60/597 |
| 6,883,322 B2 | * | 4/2005 | Cueman et al. .................. 60/606 |
| 6,896,475 B2 | * | 5/2005 | Graziosi et al. .................. 415/1 |
| 6,931,850 B2 | * | 8/2005 | Frank et al. ...................... 60/608 |
| 2005/0008904 A1 | * | 1/2005 | Suppes ............................. 429/9 |
| 2007/0261399 A1 | * | 11/2007 | Mallampalli et al. ........... 60/319 |
| 2008/0047266 A1 | * | 2/2008 | Dumas et al. ................ 60/605.1 |

FOREIGN PATENT DOCUMENTS

| | | | | |
|---|---|---|---|---|
| GB | 2233037 A | * | 1/1991 | |
| GB | 2252128 A | * | 7/1992 | |
| JP | 01219411 A | * | 9/1989 | |

* cited by examiner

*Primary Examiner* — Mary A Davis (74) *Attorney, Agent, or Firm* — Francis T. Coppa (57) ABSTRACT

A device is provided. The device includes an inlet manifold configured to direct an exhaust gas flow within the device, an air inlet configured to introduce an airflow within the device and at least one surface of the device having a Coanda profile configured to entrain incoming air through the exhaust gas flow to generate a high velocity airflow.

1 Claim, 8 Drawing Sheets

TURBOCHARGER FOR A VEHICLE WITH A COANDA DEVICE

BACKGROUND

The invention relates generally to energy extraction systems, and more particularly, to a device for enhancing efficiency of an energy extraction system.

Various types of energy extraction systems are known and are in use. For example, gas turbines extract energy from a flow of combustion gas and are employed for applications such as power generation, marine propulsion, gas compression, cogeneration, offshore platform power and so forth. Similarly, wind turbines convert kinetic energy of wind into mechanical work for applications such as power generation. Furthermore, internal combustion engines employed in vehicles generate power for driving the vehicle.

Certain energy extraction systems employ Brayton cycle where air is compressed through a compressor and the compressed air is combusted with a fuel in a combustion chamber. Further, hot gases from the combustion chamber are expanded through a turbine or a series of turbines for generating mechanical work. Typically, the Bratyon cycle based systems expand hot gases through the turbines and any residual heat is lost to the environment without being utilized. In certain systems, large and expensive recuperators are employed for recovery of the residual heat. However, it is relatively expensive to employ such recuperators for recovering this heat in smaller systems.

Accordingly, there is a need for an energy extraction system that has a high efficiency with substantially low heat rejection losses. Furthermore, it would be desirable to provide a device that can be integrated with existing energy extraction systems for minimizing the heat losses and enhancing the efficiency of such systems.

BRIEF DESCRIPTION

Briefly, according to one embodiment a device is provided. The device includes an inlet manifold configured to direct an exhaust gas flow within the device, an air inlet configured to introduce an airflow within the device and at least one surface of the device having a Coanda profile configured to entrain incoming air through the exhaust gas flow to generate a high velocity airflow.

In another embodiment, a turbocharger for a vehicle is provided. The turbocharger includes a compressor configured to compress an intake airflow and a turbine configured to expand exhaust gases from an internal combustion engine for rotating a shaft. The turbocharger also includes a device coupled to the turbine and configured to entrain incoming air via the exhaust gases to generate mechanical work through a high velocity airflow. The device includes at least one surface of the device having a Coanda profile wherein the Coanda profile is configured to facilitate attachment of the exhaust gases to the profile to form a boundary layer and to entrain the incoming air to generate the high velocity airflow.

In another embodiment, a hybrid vehicle is provided. The vehicle includes an internal combustion engine and a turbocharger coupled to the internal combustion engine. The turbocharger includes a turbine configured to expand exhaust gases from the internal combustion engine for generating mechanical work and a device coupled to the turbine and configured to introduce exhaust gases along a Coanda profile to entrain incoming air for generating mechanical work through a high velocity airflow. The vehicle also includes an electrical generator configured to generate electrical power from the mechanical work and a rechargeable energy storage system for storing the electrical power for driving an electric motor of the vehicle.

In another embodiment, a method of operation of a hybrid vehicle is provided. The method includes operating an internal combustion engine to drive the vehicle in a first mode of operation and introducing exhaust gases from the internal combustion engine over a Coanda profile for entraining additional airflow to generate mechanical work through a high velocity airflow. The method also includes generating electrical power from the mechanical work for driving the vehicle in a second mode of operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to enhance efficiency of certain energy extraction systems such as gas turbine and wind turbine systems by minimizing the heat losses from such systems. In particular, the present technique utilizes the combination of a working fluid and ambient air to generate mechanical work and power. Turning now to the drawings and referring first to FIG. 1 an energy extraction system 10 having a device 12 for recovering heat from the system 10 is illustrated. In the illustrated embodiment, the device 12 is configured to receive a pressurized flow 14 from the energy extraction system 10 and to introduce the pressurized flow along a Coanda profile of the device 12. As used herein, the term "Coanda profile" refers to a profile that is configured to facilitate attachment of a stream of fluid to a nearby surface and to remain attached even when the surface curves away from the original direction of fluid motion.

In operation, the Coanda profile facilitates attachment of the pressurized flow 14 to the profile resulting in the formation of a boundary layer that is configured to entrain additional fluid flow 16 to create a high velocity fluid flow 18. In one exemplary embodiment, the pressurized flow includes an exhaust gas and the additional fluid flow includes airflow. Further, the high velocity fluid flow 18 may be directed to an end use system 20 through a flow path that is in fluid communication with the device 12. In one exemplary embodiment, the device 12 is coupled to a gas turbine system and is configured to generate mechanical work through the high velocity fluid flow 18. In another embodiment, the device 12 is coupled to a turbocharger and is configured to enhance efficiency of an internal combustion engine of a vehicle. In another exemplary embodiment, the device 12 is coupled to a wind turbine system and is configured to generate electrical power through the high velocity fluid flow 18. Further, in another exemplary embodiment, the high velocity fluid flow 18 may be directed to drive an amusement park ride. As described above, the device 12 employs a Coanda profile and utilizes the pressurized fluid flow 14 such as an exhaust gas from the energy extraction system 10 to entrain additional fluid flow 16 such as airflow to create the high velocity fluid flow 18. Further, the high velocity fluid flow 18 may be utilized to generate additional mechanical work or electrical power from the energy extraction system 10 or may be directed to another end use system 20 for further use as will be described below with reference to FIGS. 2-10.

Figure 1:
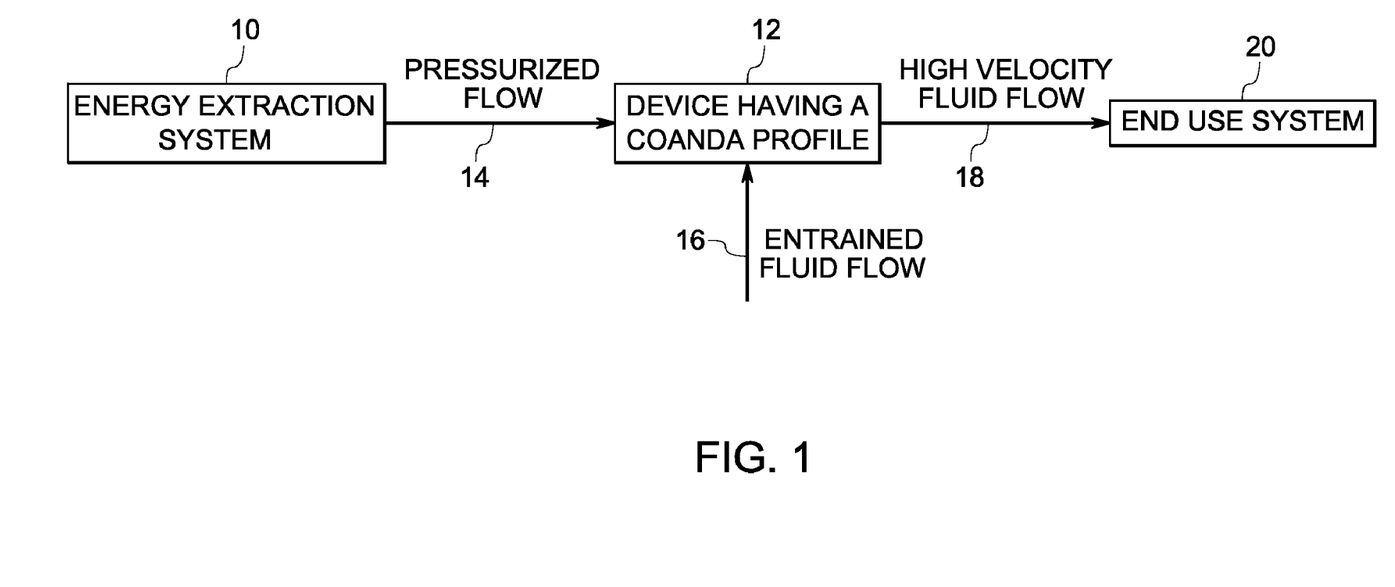
FIG. 1 is a diagrammatical illustration of an energy extraction system having a device for recovering heat from the system in accordance with aspects of the present technique.
Figure 2:
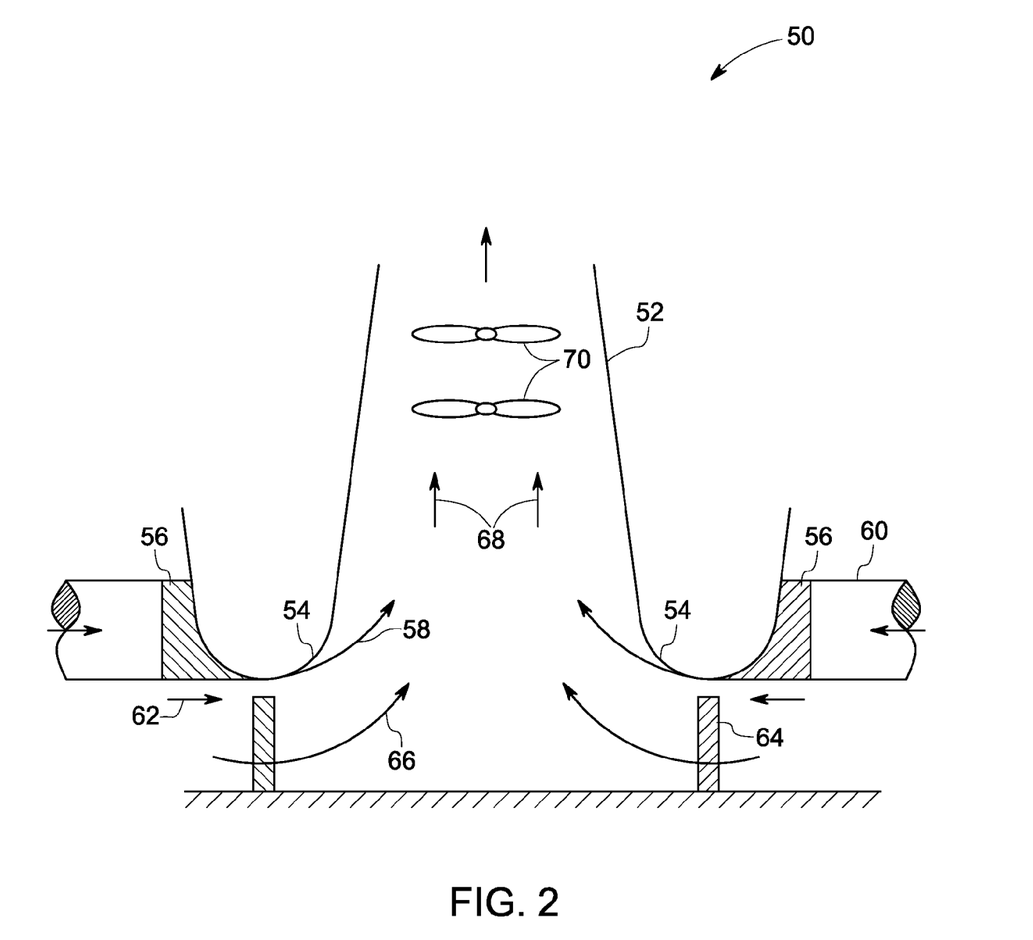
FIG. 2 is a diagrammatical illustration of an exemplary configuration of the device of FIG. 1 in accordance with aspects of the present technique.

FIG. 2 is a diagrammatical illustration of an exemplary configuration 50 of the device 12 of FIG. 1 in accordance with aspects of the present technique. As illustrated, the device 50 includes a stack 52 that receives a primary fluid such as an exhaust gas from a system. In this embodiment, at least one surface of the stack 52 includes a Coanda profile 54 that is configured to facilitate attachment of the exhaust gas to the profile 54. In one exemplary embodiment, the Coanda profile 54 includes a logarithmic profile. In operation, a pressurized flow of primary fluid such as an exhaust gas from a plenum 56 is introduced along the Coanda profile 54 as represented by reference numeral 58. In the illustrated embodiment, the primary fluid may be supplied to the plenum 56 via a conduit 60. For example, an exhaust gas from a gas turbine may be supplied to the plenum 56 through the conduit 60. Further, the stack 52 includes an inlet 62 for introducing a secondary fluid flow such as airflow into the stack. In certain embodiments, the inlet 62 includes a filter 64 for filtering the incoming airflow prior to its introduction within the stack 52.

During operation, the pressurized exhaust gas 58 entrains airflow 66 to generate a high velocity airflow 68. In particular, the Coanda profile 54 facilitates relatively fast mixing of the pressurized exhaust gas 58 with the entrained airflow 66 and generates the high velocity airflow 68 by transferring the momentum from the pressurized exhaust gas 58 to the airflow 68. It should be noted that the geometry of the stack 52 may be designed to achieve a desired velocity of the flow 68. Further, the high velocity airflow 68 may be utilized to generate mechanical work. In the illustrated embodiment, the stack 52 employs a plurality of fans 70 for extracting work through the high velocity airflow 68. In certain other embodiments, the high velocity airflow 68 may be directed to enhance efficiency of another system by generating mechanical work or electrical power.

Figure 3:
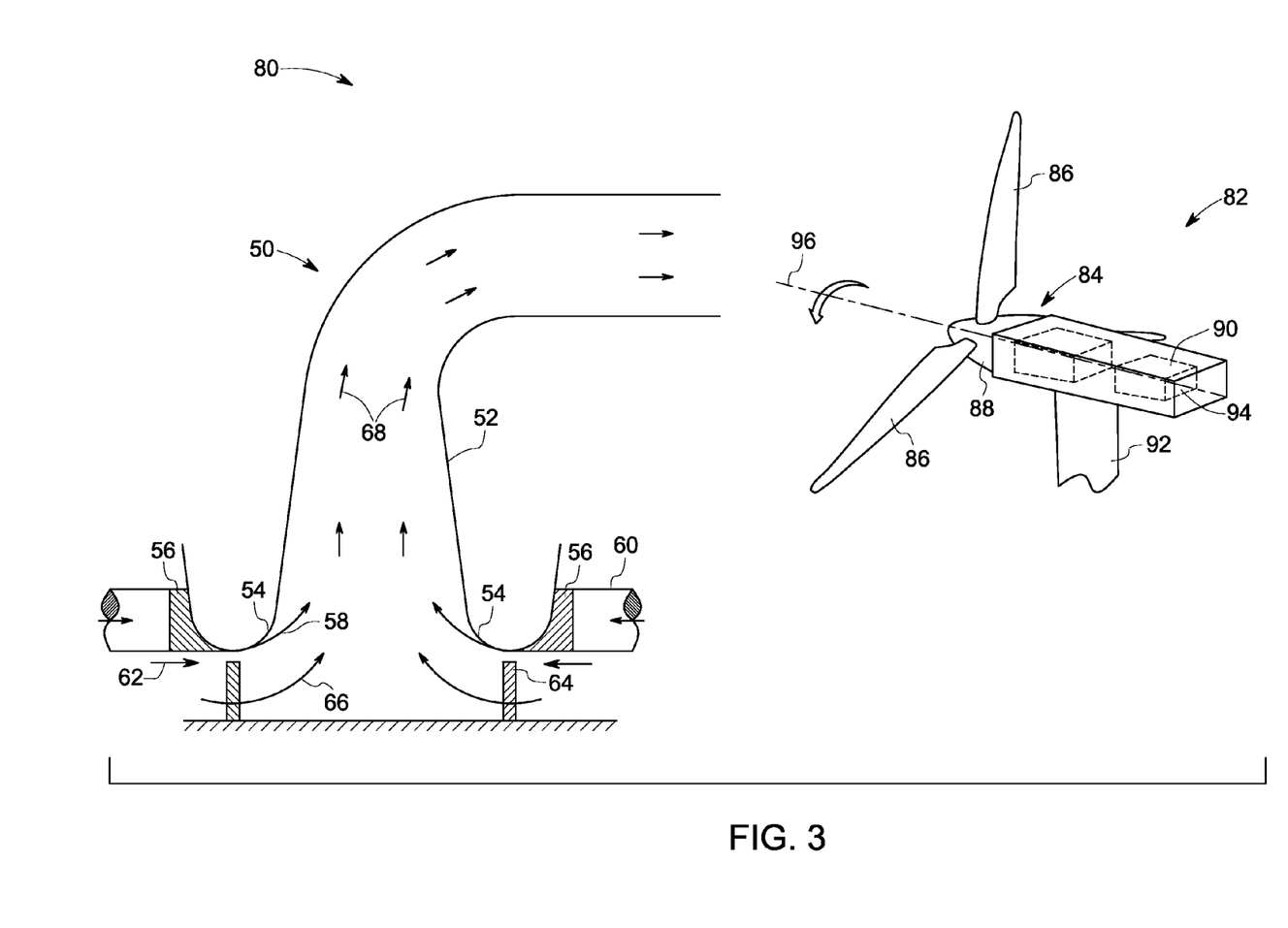
FIG. 3 is a diagrammatical illustration of an exemplary configuration of a wind turbine system having the device of FIG. 2 in accordance with aspects of the present technique.

FIG. 3 is a diagrammatical illustration of an exemplary configuration of a wind turbine system 80 having the device 50 of FIG. 2 in accordance with aspects of the present technique. In the illustrated embodiment, the device 50 includes the Coanda profile 54 that facilitates attachment of the exhaust gas 58 to the profile 54 to form a boundary layer for entraining the incoming airflow 66 to generate the high velocity airflow 68 from the device 50 that is further directed to a wind turbine 82. In this exemplary embodiment, the exhaust gas 58 includes exhaust gas generated from a gas turbine (not shown).

The wind turbine system 80 includes a rotor 84 having a plurality of wind turbine blades such as represented by reference numeral 86 mounted on a hub 88. The wind turbine system 80 also includes a nacelle 90 that is mounted atop a tower 92. The rotor 84 is drivingly coupled to an electrical generator 94 via drive train (not shown) housed within the nacelle 90. The tower 92 exposes the blades 86 to the high velocity wind flow 68 generated from the stack 52, which causes the blades 86 to rotate about an axis 96. The blades 86 transform the kinetic energy of the wind into a rotational torque, which is further transformed into electrical energy via the electrical generator 94. In one exemplary embodiment, the velocity of the high velocity wind 68 generated from the stack 52 is more than 100 km/h and is tuned to maximize the efficiency of extracting power, for a given swept rotor area, exhaust gases flow rate and entrainment rate. In certain embodiments, the wind turbine system 80 may include a plurality of devices 50 for generating a desired flow of wind for driving the wind turbine 82.

Figure 4:
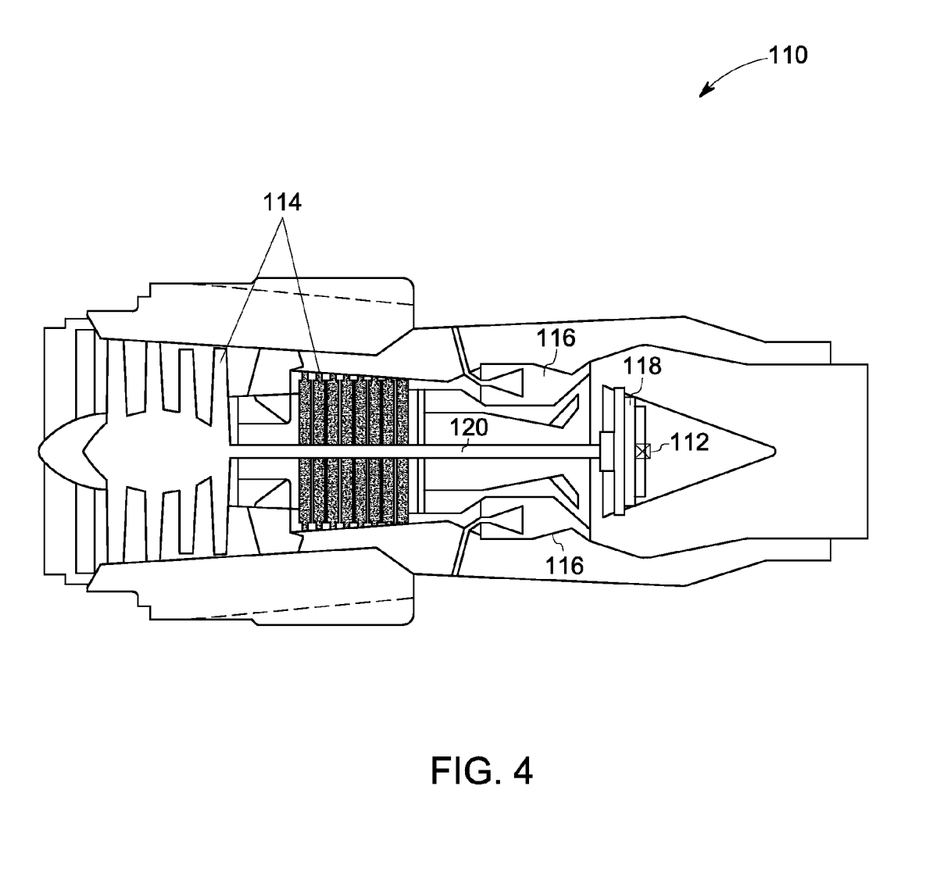
FIG. 4 is a diagrammatical illustration of a gas turbine having a device for recovering heat from exhaust gases from the turbine in accordance with aspects of the present technique.

FIG. 4 is a diagrammatical illustration of a gas turbine 110 having a device 112 for recovering heat from exhaust gases from the gas turbine 110 in accordance with aspects of the present technique. The gas turbine 110 includes a compressor 114 configured to compress ambient air. A combustor 116 is in flow communication with the compressor 114 and is configured to receive compressed air from the compressor 116 and to combust a fuel stream to generate a combustor exit gas stream. In addition, the gas turbine 110 includes a turbine 118 located downstream of the combustor 116. The turbine 118 is configured to expand the combustor exit gas stream to drive an external load. In the illustrated embodiment, the compressor 114 is driven by the power generated by the turbine 118 via a shaft 120.

In operation, the fuel stream and air once combusted at a desired temperature and pressure in the combustor 116 generate exhaust gases. The generated exhaust gases are then directed towards the device 112 that is coupled to the turbine 118. In the illustrated embodiment, the device 112 is configured to form a boundary layer and to entrain additional airflow via the exhaust gases to generate mechanical work through a high velocity airflow. In particular, the entrained air forms a shear layer with the boundary layer to accelerate the air at a converging section of the device 112 and to facilitate mixing of the boundary layer and the incoming air to generate the high velocity airflow at a divergent section of the device 112. Furthermore, the divergent section of the device 112 generates a thrust from pressure forces resulting from the interaction between the exhaust gases and the entrained air. The operation of the device 112 coupled to the turbine 118 will be described in detail below with reference to FIGS. 5-8.

Figure 5:
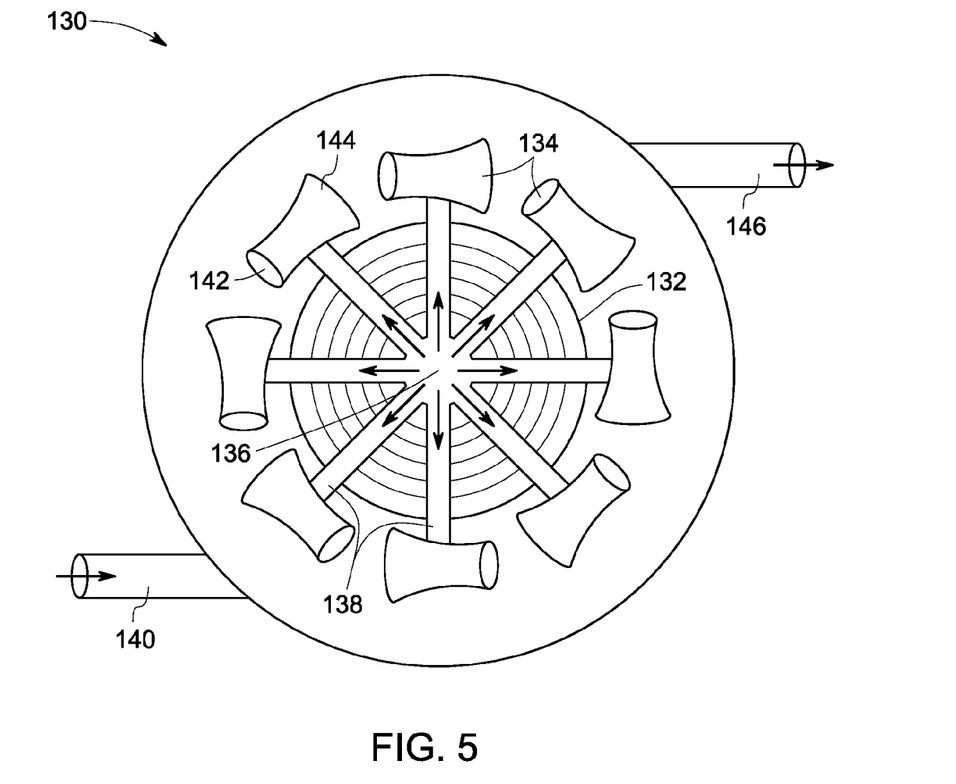
FIG. 5 is a diagrammatical illustration of a turbine disk having the device employed in the gas turbine of FIG. 4 in accordance with aspects of the present technique.

FIG. 5 is a diagrammatical illustration of an exemplary configuration 130 of a turbine disk 132 employed in the gas turbine 110 of FIG. 4 in accordance with aspects of the present technique. In the illustrated embodiment, a plurality of devices 134 are disposed at the periphery of the turbine disk 132 and are configured to enhance the efficiency of the gas turbine 110 by utilizing exhaust gases generated in the combustor 116 (see FIG. 4). More specifically, the plurality of devices 134 are configured to accelerate the turbine disk 132 by air entrainment fluidically driven by the exhaust gases from the combustor 116. The exhaust gases from a core 136 of the turbine disk 132 are driven to each of the plurality of devices 134 via a plurality of radial channels 138. In particular, the plurality of radial channels 138 are configured to direct the exhaust gases from the core 136 within individual plenums (not shown) of the plurality of devices 134. In certain embodiments, a plurality of slots (not shown) are employed to introduce the exhaust gases from the individual plenums over a Coanda profile within the plurality of devices 134. Advantageously, the introduction of the hot gases towards the inner side of the devices 134 via the slots promotes a high velocity airflow that is introduced in a tangential direction to the Coanda profile within the device 134.

In addition, the turbine disk 132 receives airflow through an air inlet 140 that is directed to an inlet 142 of each of the plurality of devices 134. As described above, the plurality of devices 134 facilitate attachment of the incoming gases to a Coanda profile of the devices 134 to form a boundary layer and to entrain the incoming air from the inlet 142 to generate a high velocity airflow at a divergent section of the device 134 that is discharged via an outlet 144 of the device 134. In certain embodiments, a ratio of the mass of air entrained by the device 134 and mass of the exhaust gas is between about 5 to about 22. It should be noted that the divergent section of the device 134 generates thrust from the pressure forces resulting from the interaction between the hot gases and air. As a result, torque generated from the devices 134 rotates the turbine disk 132 and mechanical work may be extracted from the rotation of the turbine disk 132 via a shaft. Further, the exhaust from the turbine disk 132 is discharged to the ambient via an outlet 146.

In certain embodiments, an electrical generator (not shown) may be coupled to the gas turbine 110 for generating electrical power from the mechanical work. Further, in certain other embodiments, a pulse detonation device (not shown) may be employed to create the driving exhaust gas stream for entraining and accelerating pulses of incoming air via the Coanda profile. In one exemplary embodiment, the turbine disk 132 receives hot gases from the turbine 118 (see FIG. 4) that drives the compressor 114 (see FIG. 4) and the fuel may be added in a plenum re-heat chamber at the core of the turbine disk 132. The combustion process produces gases that are expanded through the devices 134 and into the ambient thereby driving the turbine disk 132. Again, the mechanical work generated through the turbine disk 132 may be extracted via a shaft.

Figure 6:
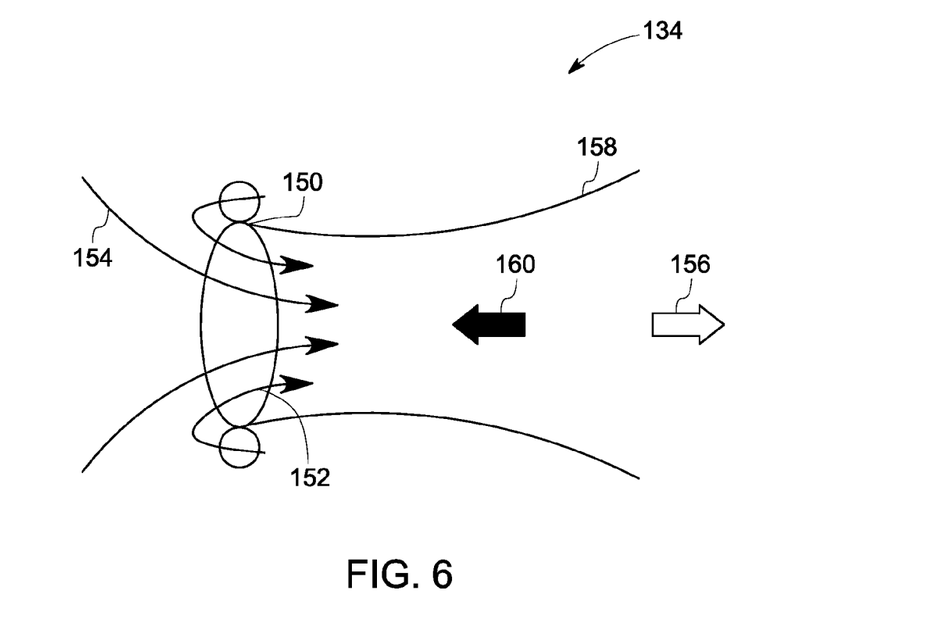
FIG. 6 is a diagrammatical illustration of the device employed in the turbine disk having of FIG. 5 in accordance with aspects of the present technique.

FIG. 6 is a diagrammatical illustration of the device 134 employed in the turbine disk 130 of FIG. 5 in accordance with aspects of the present technique. In the illustrated embodiment, exhaust gases from combustor 116 (see FIG. 4) are introduced over a Coanda profile 150 as represented by reference numeral 152. The Coanda profile 150 facilitates attachment of the exhaust gases 152 to the profile to form a boundary layer and entrains incoming air 154 to generate a high velocity airflow 156. In this exemplary embodiment, the Coanda profile 150 includes a logarithmic profile. The Coanda profile 150 facilitates entrainment of air 154 to form a high velocity annular pattern flow of a continuous or individual rapidly mixing boundary layers as jets. In certain embodiments, the hot gases experience a rotation of about 90 degrees and entrain air up to about 5 to 22 times the mass of the hot gases. In addition, the entrained air 154 forms a turbulent shear layer with the boundary layer to accelerate the air 154 at a converging section of the device 134 and to facilitate mixing of the boundary layer and the incoming air 154 to generate the high velocity airflow 156 at a divergent section 158. As a result, the high velocity airflow 156 creates thrust 160 and pushes the device 134 towards the opposite direction. The formation of the boundary and shear layers for generating the high velocity airflow 156 will be described in detail below with reference to FIGS. 7-8.

Figure 7:
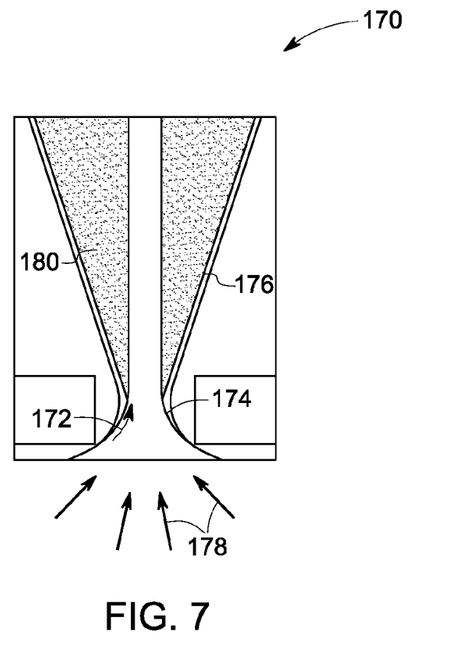
FIG. 7 is a diagrammatical illustration of flow profiles of air and exhaust gases within the device of FIG. 6 in accordance with aspects of the present technique.

FIG. 7 is a diagrammatical illustration of flow profiles 170 of air and exhaust gases within the device 134 of FIG. 6 in accordance with aspects of the present technique. As illustrated, exhaust gases 172 are directed inside the device 134 (see FIG. 6) and over a Coanda profile 174. In the illustrated embodiment, the exhaust gases 172 are introduced into the device 134 at a substantially high velocity. In operation, the Coanda profile 174 facilitates attachment of the exhaust gases 172 with the profile 174 to form a boundary layer 176. In this embodiment, the geometry and the dimensions of the profile 174 are optimized to achieve a desired efficiency. Further, a flow of incoming air 178 is entrained by the boundary layer 176 to form a shear layer 180 with the boundary layer 176 for promoting the mixing of the incoming air 178 and exhaust gases 172. It should be noted that the mixing of the air 178 and exhaust gases 172 is enhanced due to the growth of the boundary layer 176 downstream of the location of its introduction due to a appropriate pressure gradient. Thus, the shear layer 180 formed by the growth and mixing of the boundary layer 176 with the entrained air 178 facilitates formation of a rapid and uniform mixture within the device 134. The attachment of exhaust gas 172 to the Coanda profile 174 due to the Coanda effect in the device 134 will be described in detail below with reference to FIG. 8.

Figure 8:
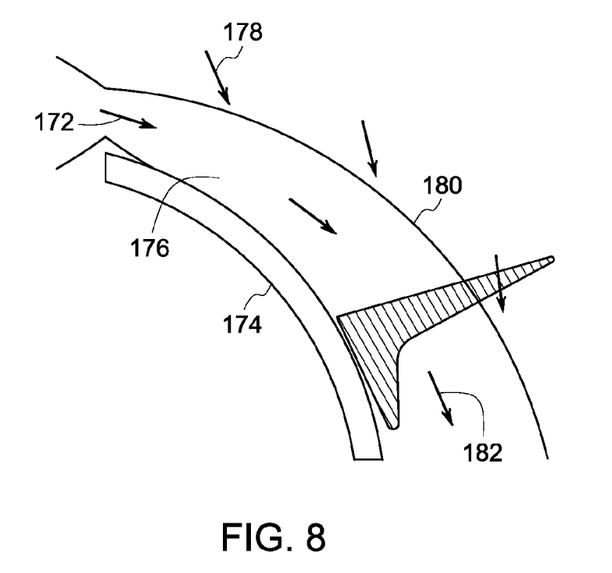
FIG. 8 is a diagrammatical illustration of the formation of boundary layer adjacent a profile in the device of FIG. 6 based upon a Coanda effect in accordance with aspects of the present technique.

FIG. 8 is a diagrammatical illustration of the formation of boundary layer 176 generated by introduction of the exhaust gas at one individual location and adjacent the profile 174 in the device 134 of FIG. 6 based upon the Coanda effect. In the illustrated embodiment, the exhaust gases 172 introduced at individual locations attaches to the profile 174 and remains attached even when the surface of the profile 174 curves away from the initial fuel flow direction. More specifically, as the exhaust gases 172 accelerate to balance the momentum transfer there is a pressure difference across the flow, which deflects the exhaust gases 172 closer to the surface of the profile 174. As will be appreciated by one skilled in the art as the exhaust gases 172 move across the profile 174, a certain amount of skin friction occurs between the exhaust gases 172 and the profile 174. This resistance to the flow 172 deflects the exhaust gases 172 towards the profile 174 thereby causing it to stick to the profile 174. Further, the boundary layer 176 formed by this mechanism entrains incoming airflow 178 to form a shear layer 180 with the boundary layer 176 to promote mixing of the airflow 178 and exhaust gases 172. Thus, injection of exhaust gases 172 through a circumferential slot or set of slots and across a profile 174 designed to facilitate Coanda effect generates a driving force that drives a fluid, such as air to accelerate. Furthermore, the shear layer 180 formed by the growth and mixing of the boundary layer 176 with the entrained air 178 generates a high velocity airflow 182 that is utilized for enhancing efficiency of a system by generating mechanical work or electrical power. In one exemplary embodiment, the high velocity airflow 182 from such device 132 may be employed to power a hybrid vehicle as described below with reference to FIGS. 9 and 10.

Figure 9:
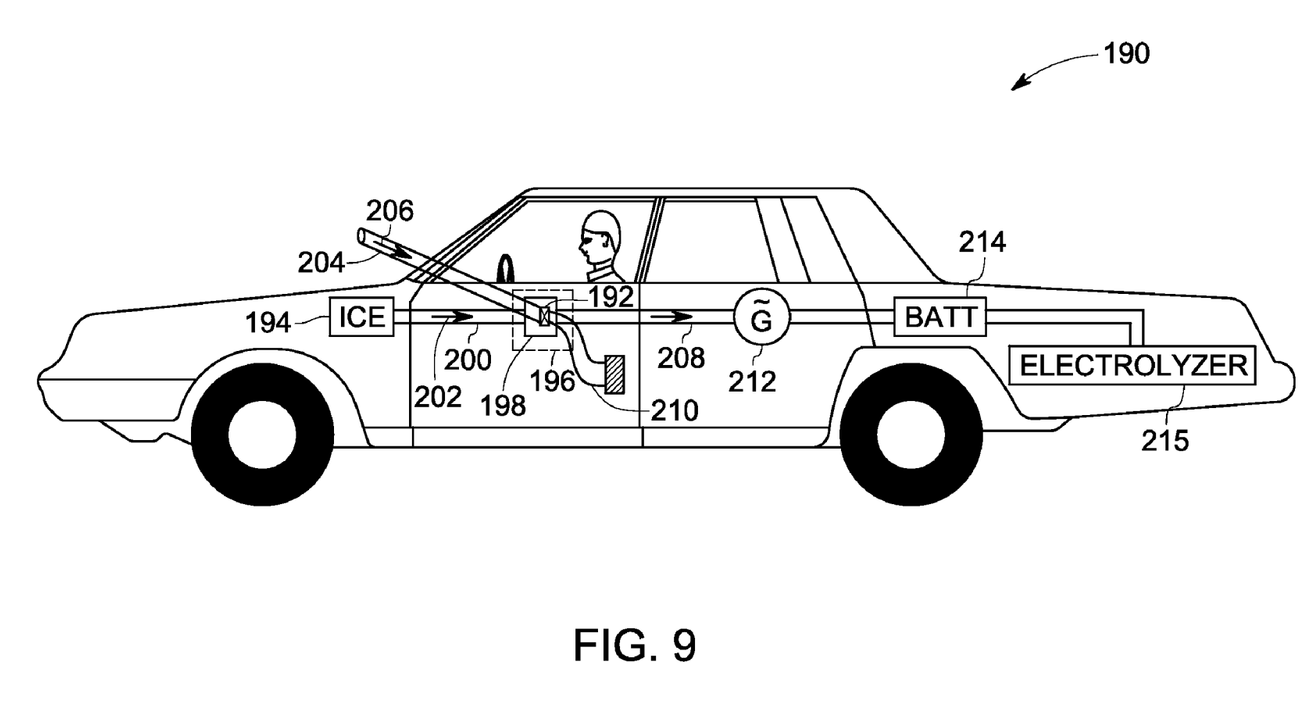
FIG. 9 is a diagrammatical illustration of a hybrid vehicle having a device for recovering hot gases from an internal combustion engine in accordance with aspects of the present technique.

FIG. 9 is a diagrammatical illustration of a hybrid vehicle 190 having a device 192 for recovering hot gases from an internal combustion engine 194 in accordance with aspects of the present technique. As illustrated, the hybrid vehicle includes the internal combustion engine 194 for driving the vehicle 190 by combusting a fuel. In addition, the vehicle 190 includes a turbocharger 196 coupled to the internal combustion engine 194. The turbocharger 196 includes a turbine 198 configured to expand exhaust gases from the internal combustion engine 194 for generating mechanical work. Further, the turbocharger 196 includes the device 192 coupled to the turbine 198 for generating mechanical work by employing a Coanda profile as described above. The device 192 includes an inlet manifold 200 configured to direct an exhaust gas flow 202 from the internal combustion engine 194 within the device 192. Further, the device 192 includes an air inlet 204 configured to introduce an airflow 206 within the device.

Moreover, at least one surface of the device 192 includes a Coanda profile that is configured to entrain incoming air 206 through the exhaust gas 202 to generate a high velocity airflow 208 as described above. The high velocity airflow 208 is subsequently utilized for generating mechanical work. In the illustrated embodiment, the vehicle 190 includes an electrical generator 212 configured to generate electrical power from the mechanical work. Further, the vehicle 190 also includes a rechargeable energy storage system 214 for storing the electrical power for driving an electric motor (not shown) of the vehicle 190. In this exemplary embodiment, the rechargeable energy storage system 214 includes an electrical battery and an onboard electrolyzer 215 configured to utilize the generated electrical power for generating hydrogen. In certain embodiments, the mechanical work generated through the high velocity airflow 208 may be utilized to drive a compressor (not shown) of the turbocharger 196. Thus, the device with the Coanda profile facilitates generation of mechanical work or electrical power via entrainment of airflow 206 through exhaust gases 202 from the internal combustion engine 194 thereby enhancing the efficiency of the vehicle 190.

Figure 10:
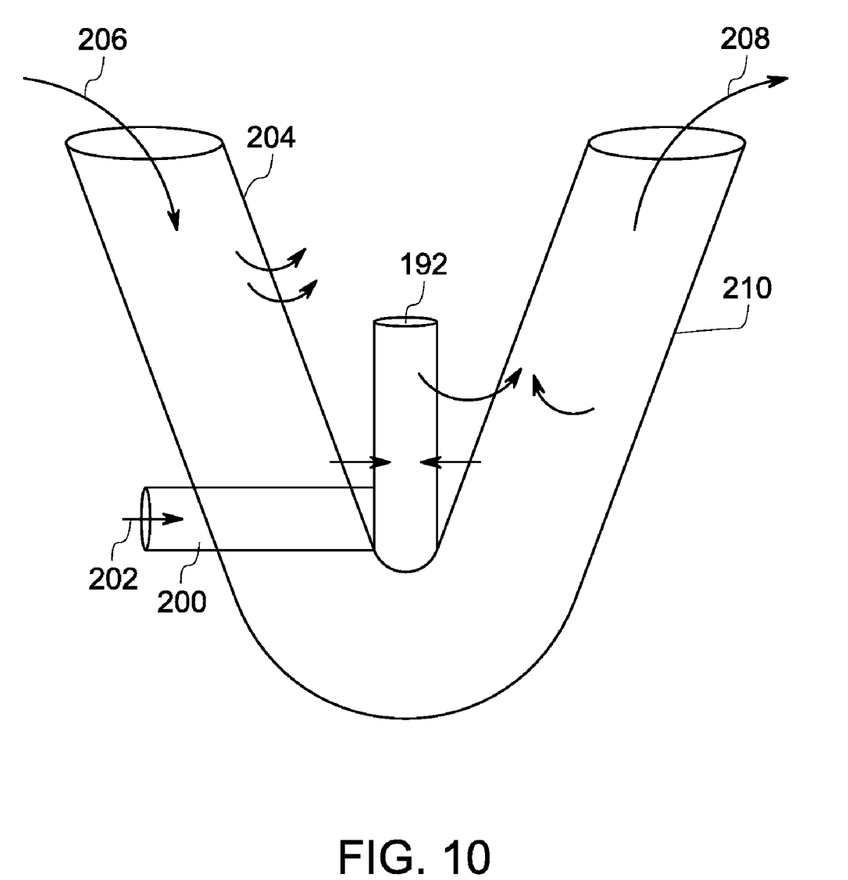
FIG. 10 is a diagrammatical illustration of the device employed in the hybrid vehicle of FIG. 9 in accordance with aspects of the present technique.

FIG. 10 is a diagrammatical illustration of the device 192 employed in the hybrid vehicle 190 of FIG. 9 in accordance with aspects of the present technique. As illustrated, the device 192 includes the inlet manifold 200 configured to direct the exhaust gas flow 202 within the device 192. Further, the device 192 includes the air inlet 204 configured to introduce airflow 206 within the device 192. The device 192 facilitates entrainment of airflow 206 by using the exhaust gas flow 202 as the driving flow via the Coanda effect and generates the high velocity airflow 208 that is discharged through the exhaust 210. In particular, the device 192 employs a combination of the exhaust gas flow 202 as the working fluid and ambient air 206 by transferring some of the energy to the airflow 206 through acceleration of stagnant air thereby creating the high velocity airflow 208. Subsequently, the high velocity airflow 208 may be utilized for generating mechanical work.

The various aspects of the method described hereinabove have utility in enhancing efficiency of different systems such as gas turbines, wind turbines, microturbines, turbochargers and so forth. The technique described above employs a device that can be integrated with existing systems and utilizes a driving fluid such as low-grade exhaust gases from a system to entrain a secondary fluid flow for generating a high velocity airflow. In particular, the device employs the Coanda effect to generate the high velocity airflow that may be further used for extracting mechanical work or generating electrical power thereby enhancing the efficiency of such systems. The device may be employed to enhance the efficiency of existing gas turbines by coupling the device with the turbine to generate mechanical work and power with substantially minimum fuel consumption. Further, the device may be coupled to existing gas turbine plants for generating artificial wind that may be directed to a wind turbine system. In addition, the device may be coupled to enhance the efficiency of a turbocharger of a vehicle through the work extraction via the exhaust gases from an internal combustion engine of the vehicle. While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A device, comprising:
an inlet manifold configured to direct an exhaust gas flow within the device;
an air inlet configured to introduce an airflow within the device;
at least one surface of the device having a Coanda profile configured to entrain incoming air through the exhaust gas flow to generate a high velocity airflow; wherein the Coanda profile comprises a logarithmic profile; and
wherein a ratio of the mass of air entrained by the device and mass of the exhaust gas flow is between about 5 to about 22.

* * * * *